UNITED STATES PATENT OFFICE.

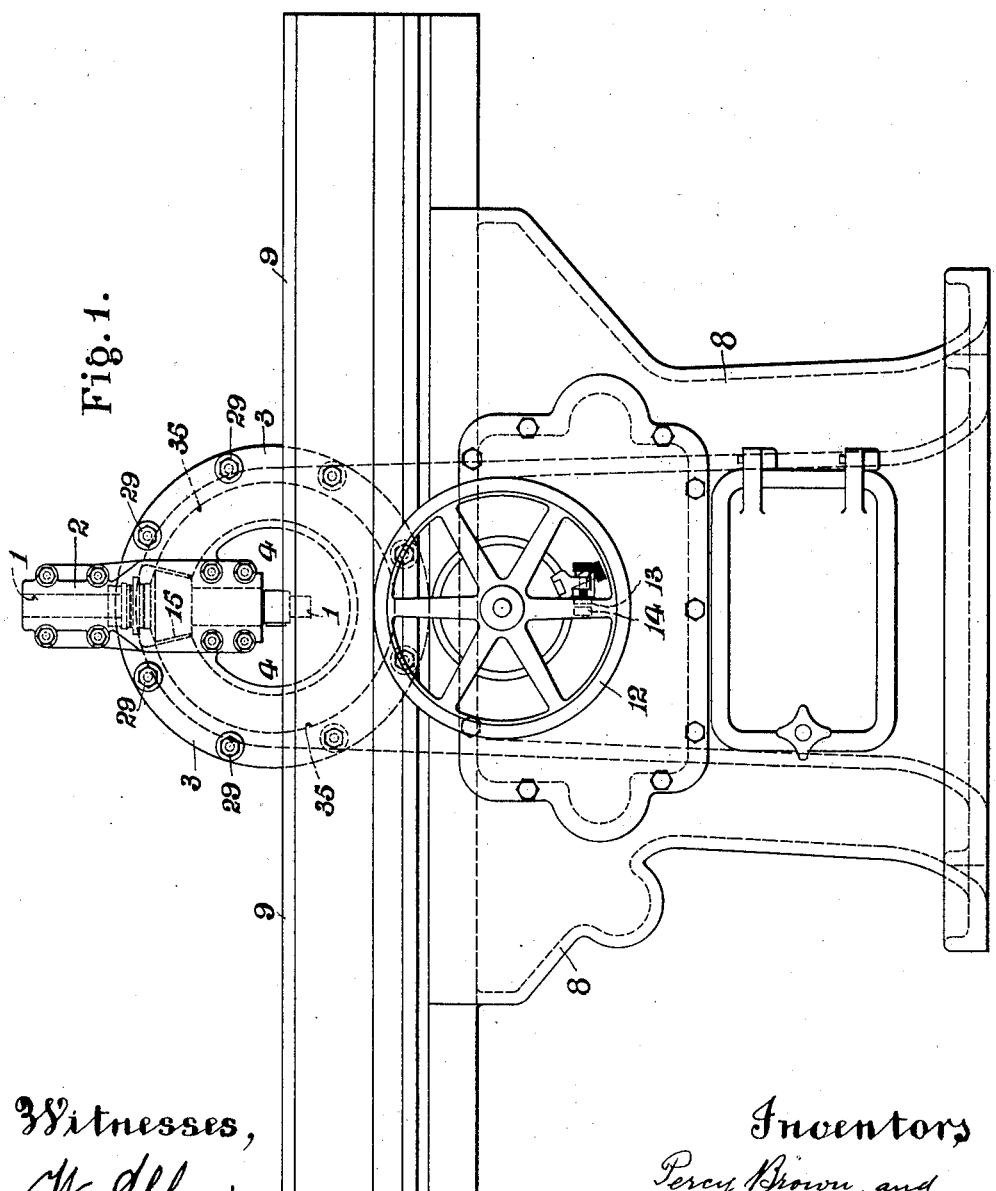

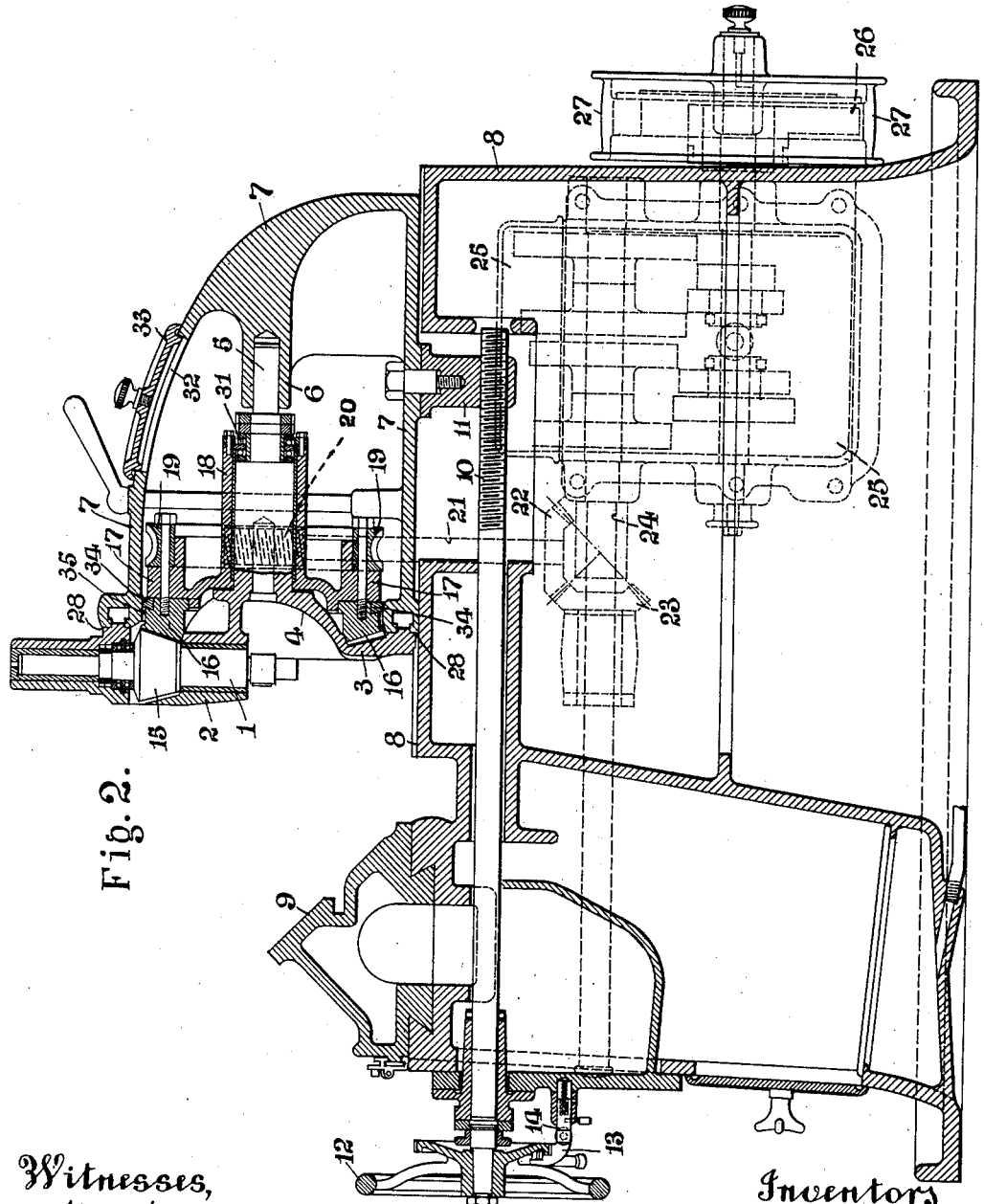

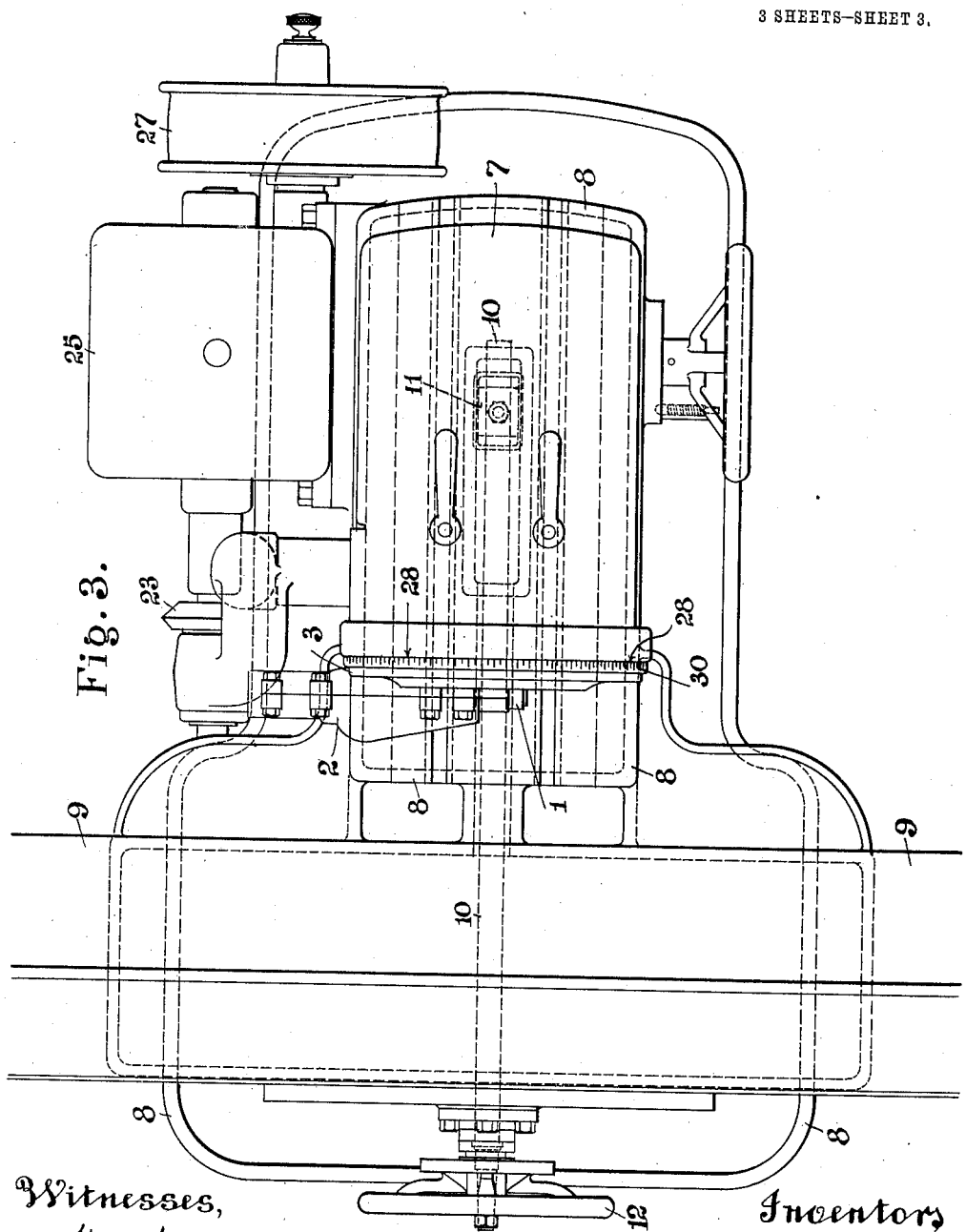

PERCY BROWN AND FRANCIS JOHN BOSTOCK, OF HUDDERSFIELD, ENGLAND.

WORM OR LIKE MILLING MACHINE.

1,100,520.  Specification of Letters Patent.  Patented June 16, 1914.

Application filed October 8, 1913. Serial No. 794,041.

*To all whom it may concern:*

Be it known that we, PERCY BROWN and FRANCIS JOHN BOSTOCK, subjects of King George V of Great Britain, residing at Huddersfield, in the county of York, England, have invented certain new and useful Improvements in Worm or like Milling Machines, of which the following is a specification.

This invention relates to worm or like milling machines in which the cutter spindle is carried in bearings or slides secured to the cutter holder and angularly adjustable thereon, the cutter holder in our arrangement being dished to receive the gearing for driving the spindle.

The invention has for its principal object the reduction of vibration of the cutter due to overhang of the cutter spindle support and to provide clearance for the cutter in alinement with the center of angular motion of the support and the driving motion, and consists in an improved construction of cutter head in conjunction with an improved arrangement of mechanism for driving the cutter spindle, whereby the object of our invention is attained. The cutter spindle has previously been variously supported and driven to minimize overhang of the said spindle but in such cases the cutter has been located at some distance from or out of alinement with the center of the driving motion.

Our invention will be described with reference to the accompanying drawings in which:—

Figures 1, 2 and 3 are respectively a front elevation, a sectional side elevation, and a plan view of a worm milling or like machine having the improvements applied thereto. It should be pointed out that the cutter spindle holder is shown in Fig. 3 in a position at right angles to that in which it is shown in the other figures.

Referring to the drawings, the cutter spindle 1 is, according to our invention, carried in a holder 2 forming part of, or it may be secured to, a swiveling plate or cover 3. This plate or cover is dished or recessed centrally as at 4 and has a rearwardly extending central spindle 5 whose reduced end is supported in an opening in a boss 6 on the interior of a head or bracket 7, which in this instance is arranged to slide on the bed 8 at right angles to the work table 9. A feed screw 10 passing through a nut 11 on the underside of the head or bracket 7, and operated by means of a hand wheel 12 provided with a suitable micrometer stop 13 adapted to coöperate with a fixed stop 14, enables the head to be accurately positioned. The head 7 need not necessarily be arranged to slide at right angles to the work table, but may be arranged in any other approved way.

The cutter spindle 1 carries a bevel pinion 15 which meshes with a bevel wheel 16 concentric with the swiveling plate or cover 3 and carried by a disk 17 whose boss 18 is freely rotatable on the spindle 5 of the cover. The disk 17 has also fast to or integral with it a worm wheel 19 driven by a worm 20 fast on a vertical shaft 21 to which motion is transmitted through bevel gears 22 and 23, shaft 24, a suitable change speed gear box 25, and clutch 26 from the main driving pulley 27 of the machine. The disk 17 may however be rotated by any other approved driving mechanism in carrying out this invention.

The plate or cover 3 is adjustably secured to an annular face 28 on the hollow bracket or head 7 by bolts 29 or other suitable means and, as will be understood, can be swung or turned to cause the cutter spindle 1 to occupy any angular position called for. The edge of the plate or cover 3 may be suitably divided as at 30, Fig. 3, to facilitate the correct angular adjustment of the cutter spindle. A suitable end thrust bearing 31 is preferably provided for the boss 18 of the disk 17 an opening 32 in the top of the head or bracket 7 provided with a removable lid or cover 33 affording access to such thrust bearing.

34 is a felt washer carried by the bevel wheel 16 or it may be by the disk 17 and rotating in a circular opening 35 in the front of the head 7, to prevent egress of oil from the head 7.

The construction and arrangement of the cutter head and driving mechanism above set forth is such that we are enabled to locate the cutter spindle quite close up to the face of the head or bracket carrying same and in alinement with the center of the driving wheel 16 and the center of angular adjustment, whereby overhang of the cutter spindle is avoided and greater accuracy in the work produced is obtained.

Having thus described our invention, what we claim as new and desire to secure by Letters Patent is:—

1. In a milling machine, the combination, with a supporting head, of a centrally dished or recessed plate pivoted in the head, a beveled toothed driving wheel journaled concentric with the said plate, a cutter spindle, a holder, for the cutter spindle, carried by the said head, and a beveled toothed pinion secured on the cutter spindle and gearing into the said wheel.

2. In a milling machine, the combination, with a supporting head, of a centrally dished or recessed plate provided with a central spindle and pivoted in the head, a beveled toothed driving wheel arranged behind the said plate and provided with a hub which is journaled on the said spindle, a cutter spindle, a holder, for the cutter spindle, carried by the said head and arranged in front of the said plate, and a beveled toothed pinion secured on the cutter spindle and gearing into the said wheel.

3. In a worm milling or like machine, the combination with a cutter spindle, and a bevel pinion fast thereon, of a holder for said spindle, a centrally dished or recessed swiveling plate or cover carrying said holder, a bevel wheel concentric with said plate or cover and meshing with the bevel pinion on the cutter spindle, and means to impart rotary motion to said bevel wheel, said parts being arranged to give clearance for the cutter opposite the center of the driving wheel and of the angular movement of the holder, substantially as herein shown and set forth.

In testimony whereof we affix our signatures in the presence of two witnesses.

PERCY BROWN.
FRANCIS JOHN BOSTOCK.

Witnesses:
T. E. WHITELEY,
C. E. HINCHLIFF.

Copies of this patent may be obtained for five cents each, by addressing the "Commissioner of Patents, Washington, D. C."